United States Patent

[11] 3,601,039

| [72] | Inventor | Donald S. Schover |
| | | Highland Park, Ill. |
| [21] | Appl. No. | 773,204 |
| [22] | Filed | Nov. 4, 1968 |
| [45] | Patented | Aug. 24, 1971 |
| [73] | Assignee | General American Transportation Corporation |

[54] SLUDGE-DEWATERING APPARATUS
12 Claims, 4 Drawing Figs.

| [52] | U.S. Cl. | 100/118, 100/152, 210/386, 210/499 |
| [51] | Int. Cl. | B30b 9/24 |
| [50] | Field of Search | 100/37, 118, 116, 122, 151–154; 210/401, 499, 351, 386, 387, 388 |

[56] References Cited
UNITED STATES PATENTS

| 880,035 | 2/1908 | Neilsen | 100/118 |
| 1,958,279 | 5/1934 | Morgan | 100/152 |
| 2,111,720 | 3/1938 | Padgett | 100/118 X |
| 2,195,371 | 3/1940 | Moore | 100/118 UX |
| 2,756,668 | 7/1956 | Seed et al. | 100/118 X |
| 3,176,607 | 4/1965 | Lapham | 100/118 |
| 3,315,370 | 4/1967 | Hikosaka | 100/118 X |
| 3,459,122 | 8/1969 | Pastoors et al. | 100/118 |

FOREIGN PATENTS

| 760,226 | 6/1967 | Canada | 100/118 |

Primary Examiner—Billy J. Wilhite
Attorney—Claron N. White

ABSTRACT: A process and an apparatus, for continuous operation of the process, dewaters sludges and mixtures of sludges. An illustrative sludge is secondary or activated sludge that is obtained after biological flocculation and settling of aqueous liquid that remains after separation of primary sludge in the treatment of domestic sewage solely or admixed with industrial sewage. In the process sludge is fed to the top surface of a suitable, compressible, resilient sheet of porous cellular material, preferably hydrophilic. A downward pressure, preferably through an overlaying sheet of such material, forces liquid at least through the bottom sheet, from which it is separated. When using the second sheet, sludge is trapped between the sheets prior to and during the pressure application. After that separation of liquid, pressure is released. Dewatered sludge cake is removed from the bottom sheet. In the apparatus an endless belt of such cellular material is moved past a sludge feeder and then under a compression device using a moving endless belt o apply the pressure. Advantageously the latter belt is of such material, but it may be a liquid-impervious belt relatively nonadherent with respect to sludge cake. Preferably the first belt is also compressed just prior to sludge addition.

SLUDGE-DEWATERING APPARATUS

BACKGROUND OF THE INVENTION

1. Field of the Invention

This invention relates to an apparatus for dewatering sludge and relates illustratively to a process for dewatering: secondary or activated sludge; primary sludge; primary sludge admixed with secondary sludge with the dewatering occurring after a digestion of the mixture; and a digested mixture of primary sludge and sludge cake obtained by dewatering secondary sludge by this process. The process used dewaters all of these sludges to provide a cake, i.e., an end product that is a solid or semisolid and thus lacks the physical characteristics of a liquid which are the characteristics of the sludges.

The sludges are obtained in the treatment of waste waters, such as domestic sewage and industrial wastes, especially the domestic sewage and certain industrial waste. From the settling of each of these preferred industrial wastes, there are obtained: primary sludge that requires further treatment, such as digestion, aerobically or anaerobically, or incineration, to obtain a product free of undesirable odor by putrefaction; and a water that contains colloidal or dissolved organic material or both convertible by biological flocculation to a product from which settles a sludge. Both of these sludges may be dewatered by use of the present invention. The primary sludge may be digested before the dewatering treatment of the invention.

2. Description of the Prior Art

As defined by G. M. Fair and J. C. Geyer on page 755 of their book entitled "Water Supply and Waste-Water Disposal" published by John Wiley & Sons, Inc. New York, N.Y. in 1954, sludge is the material removed from settling tanks in which settling has been permitted for the settleable solids that are naturally present in water and waste water or that are derived from nonsettleable matter by chemical coagulation and precipitation and by biological flocculation and precipitation. Such sludges, that are removed from the settling tanks, are not solely solids. As a matter of fact, these sludges are mixtures of suspended solids, as a minor percentage of the composition, and water, as the major percentage of the composition. After their removal some of these sludges will separate to provide a water layer and a sludge layer of somewhat higher concentration of solids but this occurs only after a long period of time of settling. In some cases the sludges have practically no settling of solids within such long period of time.

A number of sludges are amenable to conventional treatments for their dewatering. These conventional treatments include vacuum filtration, centrifugation and gravity dewatering. The dewatering operation may be performed after one of the conventional operations known as concentration operations. The conventional dewatering processes differ from differ from the concentration processes by providing, as an end product from the process, a material that is a cake or solid rather than a flowable material which is the characteristic of the initial sludge or that obtained as a product from a concentration process.

Sludges, especially activated sludges, are very difficult to filter because the suspended solids are compressible and will rapidly clog the openings of the filter medium unless flocculants are added to the sludges for the coagulation of such solids. Because of the excess cost of flocculating agents required to vacuum filter activated sludge, the part of activated sludge that is not recycled for use in the aeration of effluent from the primary settler is added to the primary sludge along with flocculants before vacuum filtering the primary sludge.

THe following description of the prior art is limited to the area of use of the present invention in which the process and apparatus of the invention have found, their first application with numerous advantages, namely to the area of treatment of domestic sewage and mixtures of it with industrial wastes or sewage, particularly the dewatering of secondary or activated sludge alone or primary sludge admixed with it, with or without a digestion of the mixture.

The disposal of raw domestic sewage is a problem that is increasing in importance due to increase in population and decrease in availability of areas for discharging sludge obtained by the treatment of such sewage. Raw domestic sewage, after removal of grit, contains water and about 0.025 percent by weight of impurities. Various processes for the removal of these impurities of domestic sewage combine various treatments and the first of these is called a primary treatment. It is a stratification by settling.

The degritted domestic sewage is allowed to stratify to remove the large solids with some of the water content. The removed materials is called a primary sludge that, according to page 770 of the book by Fair et al. mentioned above, contains water and about 2,5 percent to 5 percent by weight of solids. The solids content depends partly on the method of sludge removal from domestic sewage. A solids content of about 4 percent is conventional. The other product from this primary treatment is a liquid that is called primary effluent and contains illustratively 125 milligrams of impurities per liter or effluent.

It may be noted that mg./l. means milligrams per liter. Also, 10,000 mg./l. means 1 percent solids in a liquid.

The primary effluent is treated in a manner to provide a further reduction in the solids content of the aqueous liquid. This reduction is effected conventionally by treating the primary effluent in an aeration vessel with air bubbled into the effluent. Sufficient bacteria are in the vessel to convert, in the effluent, colloidal and dissolved organic material, that will not easily settle, into settleable solids. At the same time the number of bacteria increase. The continuous addition and the continuous withdrawal are started after a batch of primary effluent has been aerated in the vessel for a sufficient residence time. The continuously withdrawn aerated liquid is transferred to a settling tank for stratification into two layers. The upper layer is called the final effluent and either it is discharged to a stream or it is given a tertiary treatment for the removal of undesirable dissolved material, such as phosphate content, before discharging it to a stream or the like. Phosphate materials in water accelerates algae growth and the undesireability of such growth in streams and lakes is now well known.

The other layer in the settler from the aeration vessel is secondary or activated sludge and illustratively it contains between 5,000 and 10,000 mg./l. of solids. This secondary sludge contains bacteria that are necessary for the aeration of the primary effluent in the aeration vessel and that multiply in that vessel. Illustratively 90 percent of the secondary sludge is transferred or recycled to the aeration vessel. In such recycle it can be premixed with the primary effluent prior to the introduction of the latter into the aeration vessel.

It is well known that the initiation of the operation of the sewage plant being described requires the introduction of suitable bacteria produced elsewhere into the aeration vessel to initiate the operation of treatment of the primary effluent in aeration vessel. This is known as seeding the vessel with bacteria. The other portion of the recovered secondary sludge has too low a solids content to be concentrated to produce a product that can be fed to an incinerator, especially without the addition of fuel except for a startup. It is substantially more difficult to reduce the water content and thus increase the solids content of secondary sludge as compared with such increase in solids content for primary sludge. Whereas, primary sludge can be vacuum filtered to increase the solids content, it is very difficult to provide such a concentration of solids by such filtration of secondary sludge. This is because secondary sludge contains colloidal material and this causes the more rapid clogging of openings of a filter used for vacuum filtration. Another reason for the difficulty of concentrating secondary sludge by vacuum filtration is the solids to be separated are much smaller in general than those in primary sludge so that a filter medium of smaller pore size is required.

Because of the difficulty of concentrating secondary sludge by itself to provide a product of sufficiently high solids content to dispose of by combustion or by lagooning or other settling system requiring a long residence time, often the part or recovered secondary sludge that is not recycled, as described above, is mixed with the primary sludge. The volume of secondary sludge is usually less than, e.g., one-half to one-quarter of, the volume of primary sludge. The addition of this illustrative 10 percent of the secondary sludge to the primary sludge results in a reduction in solids content of the primary sludge. This mixture of secondary sludge and the primary sludge is digested, either aerobically or anaerobically, to convert those ingredients in the primary sludge that are biologically degradeable organic materials. The bacteria for this conversion are present in the digester. The bacteria feed on the biologically degradeable material in the mixture of sludges until such material is consumed. As a result the digested sludge from the digestion vessel is a product that does not putrefy to any objectionable extent, if at all.

As seen on pages 429 and 430 of the book entitled "Water Supply and Pollution Control" by John W. Clark and Warren Vessman, Jr., and published in 1965 by the International Textbook Co., Scranton, Pa., a conventional anaerobic digestion system produces a stratification such that supernatant may be separated and recycled back to the waste treatment plant. As a result, the digested sludge can have a solids content that is in the range of about 4 percent to 10 percent by weight of the sludge. The higher part of the range is attained when the mixture of sludges contains, on a weight basis, more than 4 percent and up to 6 percent solids. From an aerobic digestion the digested product illustratively contains between 2 percent and 3 percent by weight, solids.

A description of sludge digestion appears as chapter 13, of the book "Theories and Practices of Industrial Waste Treatment" by Nelson L. Nemerow and published in 1963 by Addison-Wesley Publishing Co., Inc., Reading, Mass.

For efficient digestion the sludge fed to the digester should have a solids content of about 6 percent by weight. Of course, a higher concentration in a sludge introduces an undesirably higher viscosity and other handling characteristics. As stated above, a solids content of 4 percent for primary sludge is conventional and this is reduced by the addition of activated sludge. Avoidance of this reduction and an increase in the solids content of material added to the digester would provide substantial cost reduction in the operation of a sewage treatment plant.

These end products from the digestion of primary sludge with the small amount of secondary sludge have a significantly reduced content of pathogens so that these sludges can be disposed of either by dumping in the ocean by the use of a barge or pipeline, or on a land area without creating a health hazard or a nuisance. By dumping in sludge beds or lagoons to be dewatered, the dewatered product can be removed at high labor cost that is offset only partially when it is sold as fertilizer. However, the availability of space for such beds or lagoons and the value of land are such that this type of dewatering is impractical at certain and especially at large sewage treatment plants. Thus vacuum filtration has become a necessary process for dewatering digested sludge. However, chemical cost is a factor deterring the use of vacuum filtration, especially when activated sludge has been added to the primary sludge. Vacuum filtration can eliminate the digestion treatment because sufficient lime is added to the sludge before such filtration. The lime changes the pH to reduce further decomposition and coliform count of the sludge. However, chemical costs remain an adverse factor.

The solids in domestic sludges can be placed in three classes of materials: biologically degradeable organic materials; stable organic material; and inert materials. These constitute approximately 30 percent, 35 percent and 35 percent, respectively, by weight of the solid content in domestic sludges.

The biological processes used in the digestion process convert the first class of materials primarily to gases that separate from the rest of the material in the digester. The other end product from these digestion processes is a stable inert sludge that contains water and the other two classes of solids.

Although various concentrating processes, such as gravity thickening, flotation and evaporation, have been developed for increasing the solids content of primary sludge prior to its digestion, one of different processes is used to further increase the solids content of the sludge after it has been digested. A dewatering process yields a sludge and product in cake or solid form that contains about 60 percent to percent water. This end product is hereafter referred to in this specification as sludge cake. Dewatering to this extent is a prerequisite for the making of a material that can be incinerated economically.

Vacuum filtration, which is one of these processes for dewatering, can reduce the water content sufficiently to provide a feed for incineration when primary sludge is used along or with a small amount of secondary sludge. It requires the use of flocculants that are costly and thus it is a costly dewatering process. The vacuum filtration uses a woven filter that becomes clogged in the absence of such flocculant.

The centrifugation of digested sludge is another dewatering process. It requires a feed material that contains 10 to 12 solids to economically dewater the sludge when polymers are not added to enhance the dewatering. Such centrifugation for dewatering of secondary sludge to provide a product of high solids content, e.g., 35 is not economically feasible in view of the cost for the amount of polymeric material required for secondary sludge prior to its centrifugation and the power requirement.

SUMMARY OF THE INVENTION

This invention relates to an apparatus for dewatering sludges, illustratively sludge that is primarily a domestic sludge, especially degritted sludge. The sludge that is used comprises secondary or activated sludge from domestic sewage or industrial wastes or both. The sludge to be dewatered may contain secondary sludge admixed usually with a larger amount of primary sludge. Such mixture of primary sludge and secondary sludge can be digested, aerobically or anaerobically, prior to the present dewatering process. If the dewatered product is incinerated, preferably after centrifugation, such digestion is unnecessary. Activated sludge may be dewatered by the present invention and at least part of the obtained sludge cake may be added to the digestion tank to mix with primary sludge. This dewatered-product addition will raise the solids content in the digester to about 6 percent by weight, i.e., a more efficient digestion concentration.

In the use of the present invention, a compressible, resilient sheet of porous cellular material is supported in a manner to permit the liquid flowing through it and then out its bottom surface to leave the sheet by gravitational flow. When the amount of sludge, that is added to the sheet, is less than an amount that would overflow, this sheet is incapable of transferring water through it in a reasonable time when the only force applied to the sheet containing sludge on its top surface is the force of gravity. In this process sludge is added to the top surface of the sheet and pressure is applied downwardly against the sludge and the supported sheet. The pressure is applied preferably through an overlaying sheet of such material. This second sheet traps sludge between the sheets prior to and during application of pressure.

Liquid, that passes from the sludge down through the sheet of material and out the bottom surface of the sheet, is separated. In the next step of the process, pressure is released and the following step is the removal of the dewatered sludge from the top surface of the cellular sheet of material.

In the apparatus of the present invention, the sheet of cellular material is preferably a sheet of fine-pore cellulose, which is a type of cellulose sponge that is commercially available. In view of the fact that cellulose in cellular sheet form is relatively rigid when dry, in the process of the invention the fine-pore cellulose is soaked with water and compressed for removal of excess water prior to its use in the process. This pretreatment converts the cellulosic sponge to a compressible material that does not fracture its cell walls during the compression.

In one preferred embodiment of this dewatering apparatus, the sheet of cellular material is compressed and then the compressive force is released just prior to the application of the sludge to the top surface of the sheet. This embodiment provides for a greater degree or rate of dewatering of sludge so that the sludge cake, that is removed from the top surface after the application and release of compressive force for dewatering, has a much lower water content than the sludge cake obtained from the process without such compression and start of expansion of the sheet before the addition of the sludge to the sheet.

In another embodiment of this invention, an endless belt of cellular material is moved through a path of travel so that each segment moves seriatim through several zones. Sludge, to be dewatered, is applied to the top surface of the moving belt of material at a first zone. A downward pressure is applied to the belt and applied sludge in a second zone while supporting the belt in that zone so as to compress the belt, whereby water passes from the sludge through the belt. Liquid, transferred through the belt, is removed from the second zone. Sludge cake is removed from the top surface of the belt at a third zone. This embodiment is a continuous process and preferably uses an endless belt of cellular cellulosic material and preferably uses an endless belt to apply the compressive force in the second zone. That belt is inclined in a part of the second zone with respect to the belt having sludge on it to provide an increasing amount of pressure through the second zone of the process. In this embodiment the belt that is utilized to apply the compressive force is preferably a belt of a material that could function as the belt to which the sludge is applied for a dewatering of sludge. It is preferred that this belt that is utilized to provide the compressive force and thus abuts the other belt and the applied sludge is a belt of cellular cellulosic material or other hydrophilic material.

In the various embodiments of the process, especially those in which the process is a continuous treatment, the process includes the washing of the sheet or belt to which the sludge is applied. This washing treatment is after the removal of sludge cake and prior to the reuse for dewatering. Thus, in the case of the belt it is prior to the return of that part of the belt to the first zone at which a new quantity of sludge is applied to the top surface. In this preferred aspect of the process, the water washing step is followed preferably by a step of applying a compressive force to the washed belt for the removal of a substantial part of wash liquid that would otherwise remain with the belt and decrease the efficacy of dewatering for newly applied sludge to that washed part of the belt. In the embodiments of the process that use a pair of belts, it is preferred that the belt that is used to provide the compressive force is also treated for removal of adherent sludge cake from its surface and preferably further treated with wash liquid, such as wash water, to provide a relatively clean surface, that will abut the other belt and sludge applied to it, in the compressive zone mentioned above.

In another aspect of the process in which the dewatering is performed in a continuous manner, the belt to which the sludge is applied is subjected to a compressive force and permitted to expand, with the expansion occurring in the zone at which the sludge is applied to the top surface of the belt. This increases the rate of dewatering so that higher a sludge cake of lower water content can be obtained or the rate changed for continuous operation of the process. The increased rate can be obtained by an increase in the speed of the belt and a greater rate of application of the sludge, thereby providing a greater capacity for performing the process per unit time for a particular apparatus utilized for the dewatering part of the steps of the continuous process.

In these various embodiments of the process the material used for the compressible belt of cellular material is preferably a hydrophilic material, such as cellulosic material. When using such material, the distance between the first zone, that is the zone of the application of the sludge, and the second zone, that is the zone of application of the compressive force, is sufficently great that part of the dewatering of the sludge to the extend of transfer of water into the belt can occur prior to the application of the compressive force. This is based on a discovery of the present invention that the belt of such material provides an action that provides for such transfer from the sludge into the belt. The carrying out of the process under such conditions also permits a greater overall removal of water or permits a higher speed or rate of carrying out the overall process of dewatering the sludge.

As an apparatus, the invention permits the carrying out of the process of the invention in a continuous manner. This apparatus of the invention provides for the dewatering of the sludge by including in the apparatus: (1) an endless belt having a generally horizontal run or path of travel for a portion of its movement through an endless path; (2) means to deliver the sludge to the belt at a part of that run; (3) means to drive the endless belt through this path of travel; (4) means to support the belt in a part of that portion of its travel that is in the generally horizontal run of the path of travel; (5) means to provide a downward compressive force to the supported belt at a second part of the generally horizontal path of travel downstream of the place of application of the sludge to the top surface of the belt by the means to apply the sludge to the belt; (6) means to collect liquid passing through the belt in the zone of application of compressive force; and (7) means to remove sludge cake from the top surface of the belt downstream of the zone of compressive force.

The apparatus of the invention preferably also includes another endless belt, means to move it in a path of travel including a run abutting the supported belt and applied sludge in the second part of the generally horizontal run of the latter belt. At these runs the belts move in the same direction.

In a preferred aspect of the apparatus of the invention, there are means to wash each belt downstream of the removal of sludge cake from the belts so that they are washed before the addition of sludge to the one and the subsequent utilization of the other for providing the compressive force.

In another embodiment of the apparatus of the invention, the apparatus is modified by including means to compress the belt to which the sludge is applied. This means to compress the belt is upstream but closely adjacent to the location of the means to apply sludge to the top surface of the belt, so that the belt is undergoing an expansion from its compressed state to its normal thickness at this location of application of sludge.

In the various embodiments of the apparatus of this invention, the compressible belt, to which the sludge is applied, is a cellular material having open cells and the cell size and thickness of the belt are such that there is no transfer of water from the sludge through the belt during the movement to the zone at which the means to compress the belt and applied sludge is located and functions. Of course, by using the preferred type of material, i.e., hydrophilic material, and preferably by using the preferred material, i.e., cellulose, there is some transfer of water into the belt.

DESCRIPTION OF THE DRAWINGS

The apparatus of the invention and the equipment or system of treating raw sewage to provide sludge to be treated by the apparatus are illustrated by preferred embodiments in the accompanying drawings, in which components that are the same and provide the same function are generally designated by the same numeral and in which.

DETAILED DESCRIPTION

Figure 1:
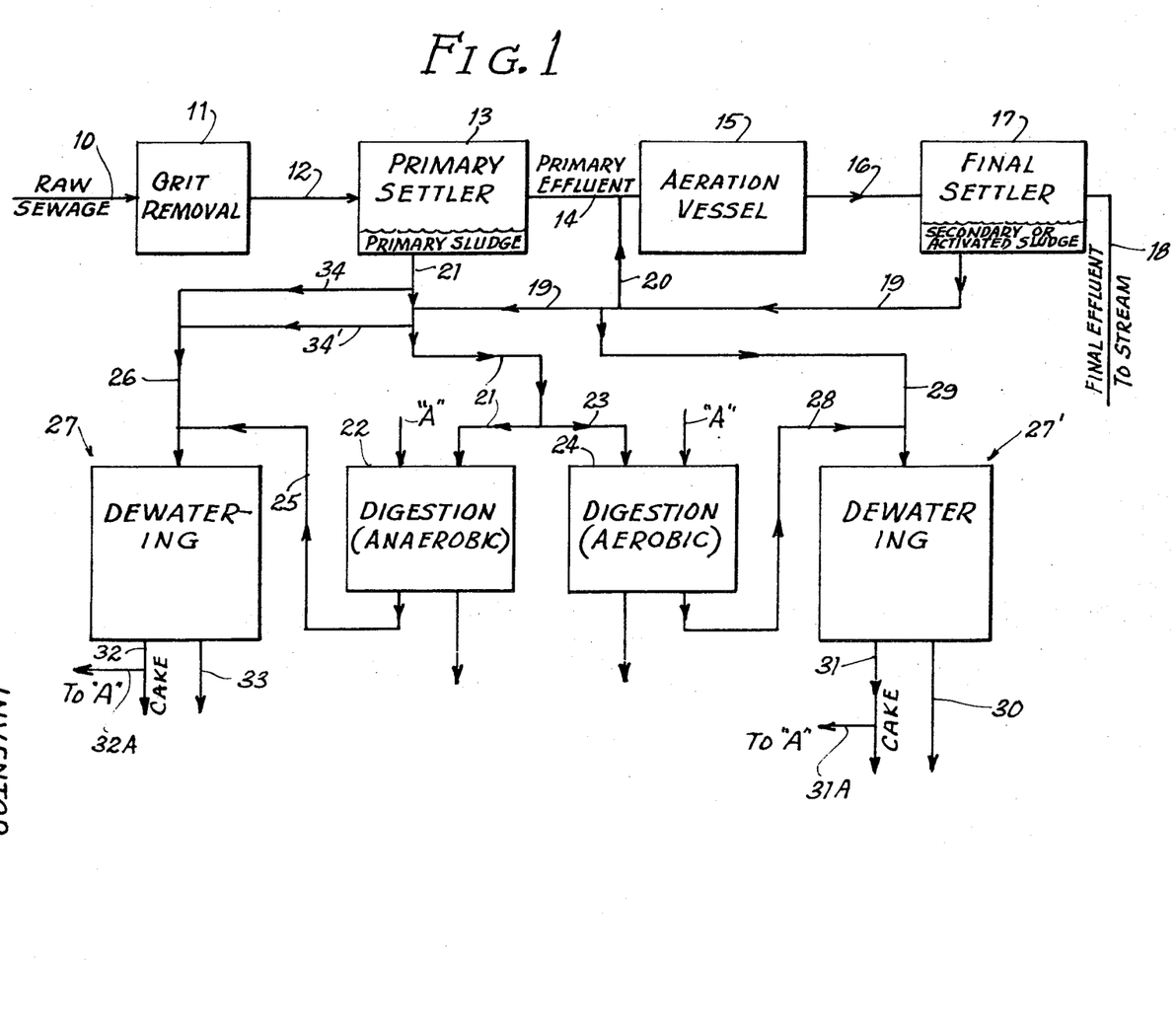
FIG. 1 is a flow diagram that illustrates one system for providing primary sludge and secondary sludge or activated sludge and the dewatering treatment of the latter either directly or after admixture with a larger amount of primary sludge and the digestion of the mixture of alternative digestion systems.

Referring to FIG. 1, raw sewage is fed by a line 10 to a conventional grit removed by a line (not shown). The degritted sewage is transferred from device 11 by a line 12 to a conventional primary settler 13 where it stratifies into two layers. As is well known, the upper layer is primary effluent that is transferred by a line 14 from settler 13 to a conventional aeration vessel 15 where the biodegradable organic materials in the primary sludge are consumed by bacteria. Then the aerated product is transferred from vessel 15 by a line 16 to a final settler 17 in which there is a stratification of the aerated product into a final effluent that is sufficiently low in solids content to be transferred by a line 18 to a stream or other suitable plane to receive such water.

The lower layer of material in settler 17 is secondary or activated sludge and it is withdrawn from settler 17 by a line 19. A major portion of this activated sludge is removed from line 19 by a line 20 that feeds this portion of activated sludge to line 14 for admixture with primary effluent. This mixture is transferred to vessel 15. This recycling of activated sludge ensures bacteria in vessel 15 to maintain the necessary biological activity in vessel 15 for the treatment of primary effluent. The portion removed from line 19 by line 20 is illustratively 90 of the activated sludge removed by line 19 from final settler 17. In view of the fact the volume of activated sludge is quite small relative to the total volume of primary effluent that is fed to aeration vessel 15 from primary settler 13 and because it is a continuous recycling, the volume of material in vessel 13 remains constant.

The minor portion of material in line 19 that is not removed by line 20 has two alternative paths of travel. In the one case, this part of the activated sludge continues through pipe 19 for its transfer to a line 21 in which it is mixed with primary sludge withdrawn from settler 13. This mixture is fed by line 21 to a digestion vessel 22 in which there is anaerobic digestion or from line 21 via line 23 to an aerobic digestion vessel 24.

In the case of anaerobic digestion of this mixture in vessel 22, the digested material is withdrawn and transferred by line 25 to a line 26 that feeds it to dewatering apparatus generally indicated at 27. The digested product from aerobic digestion vessel 24 is transferred by a line 28 to a line 29 that feeds that product to a dewatering apparatus 27'. Alternatively, activated sludge may fed from line 19, downstream of line 20, to dewatering apparatus 27'via line 29. Of course, digested product fed by line 28 and activated sludge fed directly from line 19 or by another line (not shown) from another final settler to line 29 can be admixed and then fed to apparatus 27'.

The feed to the dewatering apparatus content than any of the solids content of the feeds, mentioned above, to apparatus 27'. Thus, for the same conditions of operation of the dewatering apparatus of the present invention, the sludge cakes obtainable when using anaerobically digested product via line 25 have a higher range of solids content than have the sludge cakes from dewatering apparatus 27' using either of the feeds introduced by line 29. For these reasons, the dewatering apparatus of the invention is shown as two apparatus 27 and 27'. This permits a separate description of the nature of feeds and products. Actually both apparatus may be the same. In any event they are apparatus of this invention.

In the illustrative flow sheet shown in FIG. 1, degritted sewage in line 12 contains 250 mg./l. The primary effluent in line 14 from settler 13 contains 125mg./l. and the final effluent in line 18 contains about 10 to 25 mg./1. The primary sludge in line 21 illustratively contains about 4 percent solids while the secondary or activated sludge in line 19 contains 5,000 to 10,000 mg./l. The introduction, illustratively, of only 10 percent of the activated sludge into the primary sludge by line 19 to line 21 lowers the solids content of primary sludge fed to digester 22 or 24.

The aerobically digested product in line 28 contains about 2 to 3 solids. This lower solids content is attributable, of course, to the fact that some of the solids in the feed to vessel 24 have been removed as gaseous products of the aerobic digestion. In the case of anaerobically digested product that is transferred by line 25 to apparatus 27, the digested product contains illustratively a solids content of 4 percent by weight and higher. This product will contain up to 10 percent solids when the feed to vessel 22 contains 6 percent solids which can be the case by the addition of activated sludge cake from activated sludge from line 19 to primary sludge in line 21. In the case of either the two products fed by line 29 to apparatus 27'i.e., either digested product from vessel 24 or activated sludge directly from line 19, the aqueous liquid product withdrawn by a line 30 from apparatus 27' contains about 100 mg./l. of solids whereas the sludge cake from apparatus 27' contains 15–20 percent solids and is shown by a line 31. The dewatering apparatus 27 provides a treatment of digested product from line 25 to produce sludge cake containing about 25 to 30 percent solids represented by a line 32 and an aqueous liquid in a line 33 and containing 500 mg./l. These liquids have passed through the sheet or body of cellular cellulosic material of dewatering apparatus 27 or 27'. These aqueous products are recycled to aeration vessel 15 of the sewage treatment plant without adversely affecting its performance.

To raise the solids content of material added to digestion vessel 22 or 24, sludge cake can be added to that vessel by means represented by a line "A." The sludge cake is from line 32 or line 31. As mentioned, sludge cake from line 31 by a line 31A is used when the feed to vessel 27' is directly from line 19 via line 29. The sludge cake from line 32 by a line 32A is used when apparatus 27 is sued to dewater primary sludge taken directly from line 21, upstream of the admixture with activated sludge, by a line 34 that transfers this sludge to apparatus 27 via line 26 without digestion. Alternatively, the mixture of primary and activated sludge, taken from line 21 by a line 34' connected to line 26. Another such apparatus that is limited to make sludge of higher solids content for incineration with or without further increase in solids contents by centrifugation before the incineration may be used or the apparatus can be built with sufficient adjustablility to use these different feeds.

Figures 2, 3, 4:
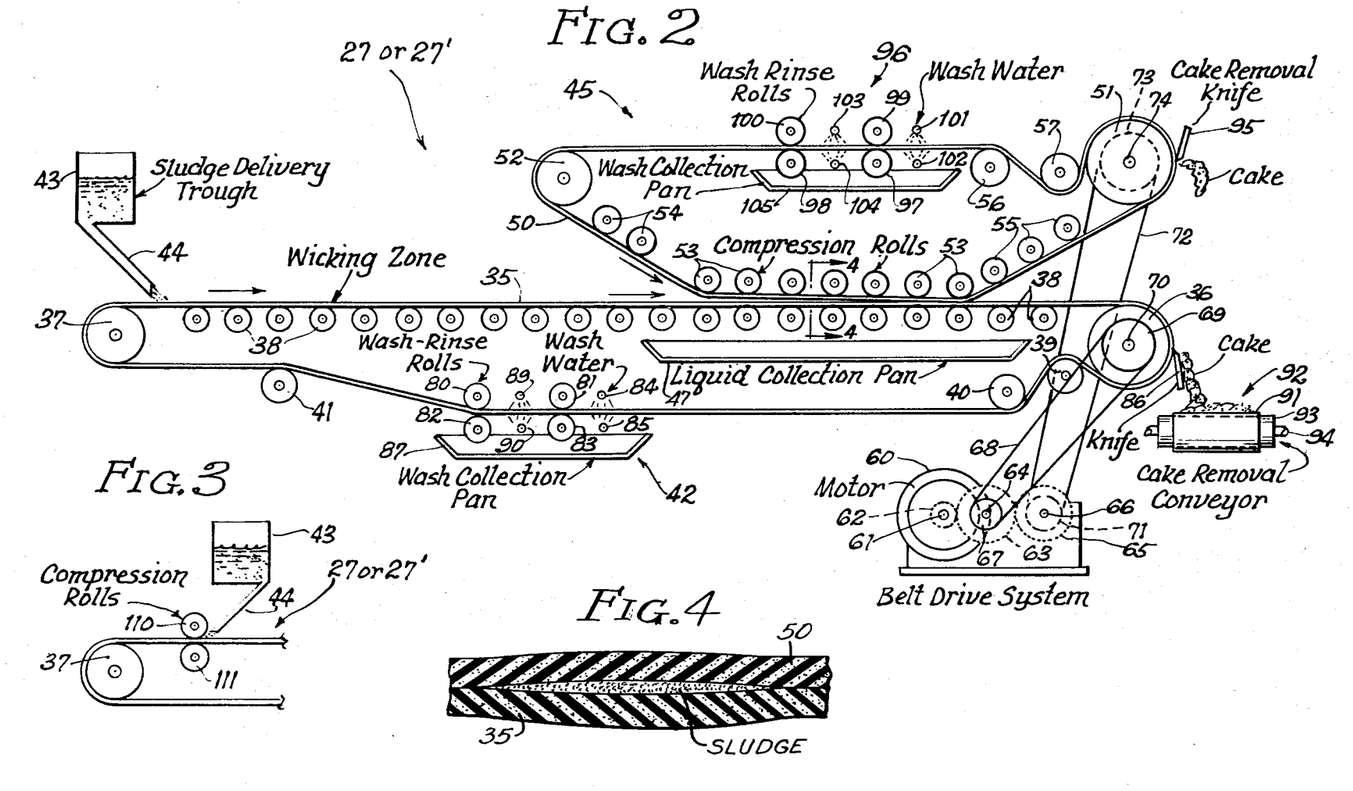
FIG. 2 is a front elevational view, partially schematic, of a preferred embodiment of the dewatering apparatus of the invention.
FIG. 3 is a fragmentary view of a second embodiment of the apparatus of the invention showing the apparatus of FIG. 2 modified at the left-hand end to provide a compression of the belt upstream of sludge application so that the belt is expanding to its normal thickness at the place of application of the sludge to be dewatered.
FIG. 4 is an enlarged, fragmentary cross section taken along line 4—4 of FIG. 2, showing a second belt, mounted above the first belt, to which sludge has been added upstream, and of sufficient width to trap partially dewatered sludge between the two belts during compression of the first belt by the second belt.

FIG. 2 represents dewatering apparatus 27 or 27' that treats material fed by line 26 or line 29, respectively. In the description that follows, only apparatus 27 is mentioned for simplification except where a reference to apparatus 27' is necessary. The apparatus 27 includes equipment that provides for washing of belts of cellular material before their reuse for dewatering.

The dewatering apparatus 27 includes an endless belt 35 of cellular material, that is passed about or trained around a roll 36 and an idler roll 37. The rolls 36 and 37 are rotatably supported by means (not shown) so that their axes are horizontal and parallel to provide a path of travel of belt 35 that includes a horizontal run for belt 35 where belt 35 is supported by a number of idler rolls 38. The lower portion of the travel of belt 35 is over an idler roll 39 and under an idler roll 40 that provide a proper degree of tautness because roll 39 is spring urged in an upward direction by a conventional construction of mounting by its support. In addition to passing over rolls 39 and 40 in the lower run, adjacent to driving roll 36, belt 35 passes over an idler roll 41 that is adjacent roll 37. The idler roll 41 is positioned to raise the bottom run of belt 35 before it reaches roll 37 so that belt 35 travels horizontally from roll 37 so that belt 35 travels horizontally from roll 41 to roll 37. This arrangement is provided to raise the bottom run of belt 35 from its horizontal portion where it is washed by a washing device generally indicated at 42 that is described in more detail later.

Sludge to be dewatered in fed by line 26 (or line 29) to a sludge delivery trough 43 of dewatering apparatus 27 (or 27') The trough 43 has a bottom outlet for feeding sludge to a chute 44. The sludge flows out a bottom opening in chute 44 which is positioned so that the outflowing sludge is fed to the upper surface of the top horizontal run of belt 35. The rate of flow of sludge from chute 44 is such that the flowable sludge when applied and thereafter, even during application of compressive force by a compression device generally indicated at 45, is and remains spaced from the edges of belt 35. This manner of feeding is provided to prevent a loss of the sludge by a flow over the edges of belt 35. If that loss would occur during the compression treatment, the overflowing sludge would flow to a liquid collection device 47 which receives aqueous liquid passed through belt 35 and removed from the sludge as one of the products of the dewatering process.

Preferably, as seen in FIG. 2, the length of belt 35 is sufficient to provide a relatively long path of travel of belt 35 in the horizontal run from the point of application of sludge via chute 44 until the belt passes under compression device 45. This is shown in FIG. 2 because in this illustration of the apparatus of the invention cellulosic material, i.e., fine-pore cellulose sponge material, is the effective part of belt 35. By the use of such material the sludge during this substantial length of travel of belt 35 from chute 44 to device 45 is partially dewatered before it and belt 35 are compressed. In this partial dewatering, part of the water of the sludge is transferred to but not through belt 35.

When the effective part of belt 35 is fine-pore cellulose, it is provided with a backing such as a textile material or webbing, that can have its ends joined in an endless construction. This provides in effect an endless belt from a number of elongated strips of such cellulose. The backing abuts rolls 36, 37, 38 and 40.

The thickness of fine-pore cellulose or of any other cellular material used in the apparatus and processes of the present invention can vary to a substantial extent. In this illustration, the thickness is about one-half inch. Sheets of such cellulose are commercially available from a number of manufactures including: E. I. du Pont de Nemours & Co., Inc. Fabrics and Finishes Department, Wilmington, Del. General Mills, Inc. Chemical Division, Tonawand, N.Y. Nylonge Corp. New York, N.Y. American Sponge and Chamois Co., New York, N.Y.

The compression device 45 includes a belt 50 that is preferably of the same construction as belt 35 as described above. The endless belt 50 is driven by a roll 51, about which it is trained. The belt 50 is also trained about an idler roll 52. The bottom run of belt 50 is downwardly inclined from roll 51 and from roll 52. This downward inclination is provided by a set of idler rolls 53 that are above belt 50 in this bottom run and that provide a slightly inclined path of travel for an intermediate portion of the bottom run of belt 50 so that this portion is opposing an intermediate portion of the top horizontal run of belt 35 with a decreasing spacing between belts 35 and 50 in the direction of travel of belt 35 toward roll 36. The roll 51 drives belt 50 in a direction so that it moves below rolls 53 in the same direction as the opposed portion of belt 35. The backing of belt 50 abuts all of these rolls.

The compression device 45 has rolls 54 between roll 52 and the set of rolls 53 and has rolls 55 between roll 51 and the set or rolls 53. The rolls 54 and 55 abut the back surface of belt 50 during the inclined travel of belt 50 down from roll 52 to the slightly inclined bottom run of belt 50 and the inclined travel up to roll 51 from the slightly inclined bottom run of belt 50.

A portion of the top run of belt 50 from roll 51 to roll 52 is diverted by an idler roller 56 and an idler roll 57 that engage the inner surface and outer surface, respectively, of belt 50. The roll 57 is mounted to provide a downward force so that roll 57, in cooperation with roll 56, provides the necessary tautness of belt 50.

The driving rolls 36 and 51 are rotated in the following manner. A motor 60 has a shaft 61 on which is fixedly mounted a gear 62 that meshes with a gear 63 fixedly mounted on a shaft 64 mounted for rotating about a fixed axis by a support (not shown). The gear 63 also engages a gear 65 that is fixedly mounted on a shaft 66 that is rotatably mounted on a support (not shown). A pulley 67 is fixedly mounted on shaft 64 and drives a belt 68 that drives a pulley 69 that is fixedly mounted on a shaft 70 on which roll 36 is fixedly mounted. A pulley 71 is fixedly mounted. Thus, the operation of motor 60 drives rolls 36 and 51 in unison. The dimensions of the gears and pulleys are such that belts 35 and 50 are operated at the same linear speed to avoid an undesirable abrasive action.

As mentioned earlier belt 35 has a bottom run with an intermediate portion that has a horizontal path of travel. This portion of the run is below a plane tangential to the bottom of rolls 36 and 37. The purpose of roll 41 to raise belt 35 up to this plane before belt 35 reaches roll 37 has also been mentioned. This bottom horizontal path of travel of belt 35 is at a horizontal plane that is tangential to the bottom of rolls 40 and to a rinse idler roll 80 that the inner surface of belt 35 passes over over before belt 35 passes over roll 41. The roll 80 and an intermediate rinse idler roll 81 that also contacts the backing of belt 35 in this horizontal path are part of washing device 42. The other surface of belt 35 is abutted by a similar pair of rolls 82 and 83 that are also rotatably mounted. The rolls 82 and 83 are below rolls 80 and 81, respectively. Thus belt 35, in its bottom horizontal path of travel, passes between rolls 81 and 83 and after a distance passes between rolls 80 and 82. In each case belt 35 is compressed to squeeze water that remains after two washing operations that are provided as described below.

Before belt 35 passes between rolls 81 and 83, it passes between an upper spray pipe 84 and a lower spray pipe 85 that furnish sprays of water across and on both sides of belt 35. The spray of water from pipe 85 removes any sludge cake from the outer surface portion of belt 35 that has not been removed by a doctor knife 86 that is mounted in a downwardly inclined manner away from roll 36 by a support (not shown) to scrape this outer surface of belt 35 as it moves about roll 36.

The knife 86 is almost vertically disposed, i.e., almost tangential to the arcuate path of travel of that surface of belt 35 about roll 36. The knife 86 has a leading edge that corresponds to a surface of a thin wire facing the oncoming sludge cake. This prevents retransfer of sludge cake onto belt 35 because the cake moves around knife 86 to the back side.

The water from pipe 84 backwashes aqueous liquid in belt 35 that was part of the aqueous liquid removed from the sludge during the compression of the latter between rolls 38 and rolls 53 in the dewatering operation. Much of the water from pipe 85 and material washed by it from the surface portion of belt 35 falls into a wash collection pan 87 that is below rolls 80 through 83 and pipes 84 and 85, as well as water spray pipes 89 and 90, that are above and below, respectively belt 35. The pipe 89 is between rolls 80 and 81 while pipe 90 is between roll 82 and roll 83.

The water added to belt 35 from pipes 84 and 85 is removed when belt 35 is squeezed by passing between rolls 81 and 83. Thus the addition of spray water from pipes 84 and 85 and the removal of water from belt 35 by rolls 81 and 83 provides for a substantial removal from belt 35 of some of aqueous liquid removed from the sludge. The further washing of belt 35 is accomplished by the sprays of wash water from pipes 89 and 90 and the subsequent passage of belt 35 between rolls 80 and 82. The pipes 84 and 85 and pipes 89 and 90 have openings along their their to provide sprays of wash liquid toward and across the width of belt 35. Liquid is removed from pan 87 by an outlet (not shown).

It is preferred that water be used for the feed to pipes 84, 85, 89 and 90; however, an aqueous liquid of low solids content, such as the final effluent that is removed from settler 17 by line 18, can be used.

The knife 86 removes practically all of the sludge cake on the outer surface of belt 35 and this cake falls beyond knife 86 onto a belt 91 of a cake removal conveyor system generally indicated at 92. The belt 91 is driven by a roll 93 that has a shaft 94 rotatably mounted on the support (not shown) and shaft 94 is driven by means (not shown).

In the use of the apparatus shown in FIG. 2 for the dewatering of sludge almost all of the sludge cake that is formed by the dewatering action remains on belt 35 and is later removed by knife 86. This is especially true when both belts 35 and 50 are cellulose sponge, i.e., fine-pore cellulose. The small amount of cake that is on the surface of belt 50 is removed by a doctor knife 95 mounted on a support (not shown ) to abut belt 50 as it passes around roll 51. The knife is downwardly inclined toward belt 50, i.e., is almost tangential to belt 50 as it passes around roll 51, and has the same shaped leading edge as knife 86, so that the sludge cake, being removed will fall downwardly onto belt 91 of conveyor system 92 that removes it as well as cake removed by knife 86 from belt 35 of the apparatus.

The substantial length of travel of belt 35 between the place of application of sludge to the beginning of the overlay of belt 35 by belt 50 of compression device 45 produces a substantial dewatering of the sludge with the aqueous liquid being received by the porous cellular material. This occurs when the material is hydrophilic, e.g., fine-pore cellulosic sponge. As a result the amount of sludge added per lineal inch, without flow of the sludge over the edges of the belt, can be greater than that added to a belt of porous cellular material that does not remove water from the sludge during this travel. Furthermore, a still larger amount of sludge can be added per lineal inch of such hydrophilic belt. Overflow of sludge in such case is avoided by longitudinal plates (not shown) of suitable nonabrasive material, e.g., nylon, mounted by a support (not shown) to contact the top surface of belt 35 adjacent its margins between the place of feed of sludge and the overlaying of belt 50. Thus the combination of the material of the belt 35 and the presence of these plates provide a greater capacity of the apparatus than that when using some other porous cellular material even with such plates for the same rate of lineal travel of belt 35.

Furthermore, the subsequent overlaying of belt 50 when it is a porous cellular material, such as fine-pore cellulosic sponge, (with suitable backing having openings) prevents loss of sludge from the area between the belts, i.e., loss by flow to the edges and then by falling into pan 47. This flow into pan 47 would undesirably contaminate liquid otherwise suitable for discard to a stream or river. The belt 50 is sufficiently thin, e.g., the thickness of belt 35 (as regards the cellular material) to transfer sufficient liquid through belt 50 to its top surface when compressed by a downstream roll 53 that liquid flows to the edges and then down to pan 50. As a result of this construction return of liquid to belt 50 when it is expanding is minimized and dewatering action and degree are enhanced. These desirable results of such construction further increase the capacity of the dewatering apparatus or the degree of dewatering or both.

The compression device 45 has associated with it a washing device generally indicated at 96 that has rolls 97 and 98 that support belt 50 in its top horizontal path of travel. The device 96 has idler rolls 99 and 100 that are above rolls 97 and 98. The belt 50 passes between rolls 97 and 99 where it is compressed again. Prior to the first passage belt 50 is washed by spray water from spray pipe 101 that is above belt 50 and from below by spray pipe 102. After compression of belt 50 by passage between rolls 97 and 99, belt 50 is further washed with liquid from above by spray pipe 103 and from below by spray pipe 104. Excess liquid is removed then by passage of belt 50 between rolls 98 and 100. The wash water and water removed by squeezing is collected in a wash collection pan 105 and removed from it by an outlet (not shown).

Referring to FIG. 3, apparatus 27 differs from that shown in FIG. 2 only by the addition of a roll 110 and a roll 111 that are above and below, respectively, belt 35 in its top horizontal run and at a location relatively adjacent to roll 37. The passage of belt 35 between idler rolls 110 and 111 compresses belt 35. As belt 35 leaves this passageway between these rolls it began to expand to its normal thickness. It is at this location that the sludge is applied to belt 35. For this purpose chute 44 is inclined downwardly toward roll 110, that is in a direction having a component that is opposite to the direction of travel of belt 35 at the place of application of the sludge to belt 35. This direction of inclination permits the application of sludge as close as possible to the place of initiation of the expansion of belt 35. In the case of chute 44 in the apparatus of FIG. 2, there is no reason to incline chute 44 other than a direction having a component that is in the direction of travel of belt 35.

In the apparatus of the invention it is necessary, due to the compression of the cellular material, to use a flexible belt of a resilient material. Cellulose is not resilient when it is completely dry. Accordingly, a belt of it is used after it has become sufficiently wet to provide the flexibility and resiliency needed to avoid fracture when compressed and to return to its original thickness when the compression force is removed. This desirable condition of cellulose sponge is obtained by soaking the sponge and then compressing it until the sponge is considered damp without water dripping from it.

The following examples illustrate the present invention and indicate illustrative operating combinations for the use of the apparatus of the invention that is shown by preferred embodiments in FIGS. 2 and 3.

EXAMPLE I

Two damp, fine-pore cellulose sponges, each measuring about 8 inches ×11 inches and one-half inch in thickness, are used. Activated sludge in the amount of 5 milliliters per square inch is applied to the top surface of one of these sponges. After about 30 seconds, the outer sponge is placed on top of this sponge and applied sludge. Then the sponges are pressed together with the total force of about 100 pounds. This provides a compression pressure on the sponges of about 1.13 p.s.i. Aqueous liquid passing through the bottom lower sponge is removed. The pressure is relieved and then the sponges are separated from each other.

Almost all of the sludge cake that is obtained by this dewatering of the activated sludge is on the top surface of the lower sponge. This cake on the lower sponge is scraped off. From various examples of performing this dewatering of activated sludge, it has been found that the cake contained between 15 percent and 20 percent solids.

EXAMPLE II

The experiment reported above in example I is repeated using the same conditions using anaerobically digested product. In these tests the sludge cake that has been obtained by scraping from the lower cellulose sponge contained between 25 percent and 30 percent solids.

EXAMPLE III

The dewatering steps and conditions of example I were repeated but an impermeable plastic sheet, specifically Mylar (a polyethylene terephthalate made by E. I. du Pont de Nemours Co., Inc., Wilmington Del.), was substituted for the upper sponge to provide the compression force against the applied activated sludge. The sludge cake contained 13 percent solids as compared with the sludge cake containing 16 percent solids from the same sludge using the two sponges. None of the cake adhered to the sheet of Mylar.

Although fine-pore cellulosic cellular material or cellulosic sponge is the preferred material, other materials are suitable; however, they provide a less efficient degree of dewatering of the sludge. One example is porous polyurethane sheet in which the sizes of the pores are comparable in size to those of fine-pore cellulose.

The advantage of digesting a feed containing about 5 percent solids, instead of a feed containing a substantially smaller concentration of solids, has been mentioned above. The decrease in solids concentration that results from the addition of nonrecycled secondary sludge to the primary sludge for digestion has also been mentioned. The following description illustrates the previously described utilization of the dewatering process of the present invention to increase the solids content, and thus decrease the water content of activated sludge, so that its addition to the digestion vessel, to which primary sludge is fed, does not decrease but actually can increase the solids content to the desired approximate 6 percent.

Seventy-five percent of sludge in line 19, that is not recycled by line 20, is admixed with primary sludge in line 21 as a feed to vessel 22 or vessel 24. The other 25 percent of this nonrecycled sludge is dewatered by the use of apparatus 27' and the sludge cake from apparatus 27' is fed by lines 31 and 31A to line "A" for admixture with the previously mentioned mixture of primary sludge and activated sludge. The resultant feed to either of these vessels is approximately 6 percent. In that case line 29 is used to feed this 25 percent of nonrecycled activated sludge for use of apparatus 27'. At that time apparatus 27' is not used to dewater digested product removed from vessel 24 by line 28. Of course, the digested product from this mixture of three materials would be dewatered by the use of apparatus 27 for anaerobically digested product or apparatus 27' for aerobically digested product, the latter being dewatered when apparatus 27' is not being used for the dewatering of the 25 percent nonrecylced activated sludge.

In the process of high-temperature, wet-air oxidation of sludge, it is also desirable to use a feed that contains about 6 percent solids. Such feed can be obtained in a similar manner, i.e., as described in the next proceeding paragraph for the feed to a digester, by the dewatering of such part of the nonrecycled activated sludge and its incorporation with the mixture of primary sludge and the balance of the nonrecycled secondary sludge for the wet-air oxidation. The production from this process of high-temperature, wet-air oxidation is readily dewatered by conventional processes so that such processes can be used, if desired, instead of the dewatering process of the present invention.

If the primary sludge is to be disposed of, without any admixture with the secondary sludge, the dewatering process of the present invention can be used to increase the solids content to a relatively high value, as mentioned above, and this sludge cake is suitable for efficient and economical centrifugation to raise the solids content to about 33 percent. This material from the centrifugation is the economical feed to an incineration operation.

When it is desired to incinerate secondary sludge as well as primary sludge, it is necessary to provide some adequate dewatering of the secondary sludge before centrifugation of it to avoid a decrease in the solids content of the feed to the centrifuge. Although it is possible by centrifugation to concentrate economically secondary sludge so that the solids content increases from about 1 percent to about 2 percent, a 50 percent volume reduction, further substantial increase in solids content is uneconomic. Although primary sludge can be gravity thickened to a concentration of up to 10 percent and this thickened sludge is economically centrifuged to provide a 33 percent solids product as a feed for incineration, the incorporation of secondary sludge, having its solids content increased to 2 percent, reduces the solids content of thickened primary sludge to which it would be added to the extent that it is not economically centrifuged to a product for incineration.

The foregoing difficulties or deficiencies of the incorporation of secondary sludge in such primary sludge after thickening and before centrifugation are avoided by dewatering the secondary sludge in accordance with the processes of the present invention and using the apparatus of the invention. This provides a sludge cake that can be admixed with thickened primary sludge and this mixture is a suitable feed for centrifugation to provide a product that can be efficiently and economically incinerated.

The dewatered digested products, i.e., sludge cakes, may be dewatered in lagoons to provide fertilizer. The sludge cakes that do not putrefy can be used to make molded products, that are fired before use in the building construction industry. The products of the process of the invention are useful for many other applications.

Furthermore, the dewatered digested products of the present process or those from this dewatering of sludges by high-temperature, wet-air oxidation, can be used directly as land fill without any nuisance to the surrounding land.

Many other uses for the products of the present invention will be obvious to one of ordinary skill in view of the foregoing disclosure and the nature of this product.

In view of the foregoing description of the apparatus of the present invention, many modifications will be obvious to one of ordinary skill in this art. For example, the apparatus can be used to separate part of the aqueous liquid from any food or industrial product that is a suspension of relatively nonsettleable solids and that cannot be suitably vacuum filtered without the addition of flocculant chemicals. These chemicals would adulterate at least one of the separated products obtained by vacuum filtration. Of course, the addition of such chemicals usually would be unnecessary, as in the case for the dewatering of the sludges. When requires a very substantially lower concentration would be needed as compared with the concentration in the vacuum filtration process.

I claim:

1. An apparatus for dewatering a flowable aqueous material containing suspended solids in an aqueous liquid, which comprises:

a first endless belt, said belt being compressible and resilient and comprising porous cellular hydrophylic material;

means to support said belt at various positions to provide an upper portion of the belt that has its outer surface in a horizontal plane to form a partial dewatering zone and a compression zone for said upper portion of the belt, said first belt being a material capable of providing by absorption a partial dewatering of the flowable aqueous material in said partial dewatering zone;

means to move said endless belt through a path of travel including a horizontal top run through said zones in which the outer surface is at said horizontal plane;

a second endless belt;

means to support the second endless belt so that it has at its lowermost portion an outer surface parallel to, adjacent and facing the outer surface of the first belt only throughout the compression zone;

means to move the second belt through a path of travel including a bottom run at said lowermost portion at the compression zone of the first belt, said moving means moving the second belt so that its bottom run is in the same direction as the top run of the first belt;

means to press the second belt in its bottom run against the first belt in the compression zone with sufficient pressure to provide a compression of the first belt;

means mounted above the top run of the first belt to deliver the flowable aqueous material to said top run of the first belt only at the beginning of the partial dewatering zone that is upstream of and spaced from the location of the compression zone;

means mounted below the compression zone to remove water transferable through the first belt by the application of pressure provided by said means to apply pressure through the second belt in the compression zone; and means to remove dewatered product from the surface of first belt downstream of the compression zone, said first belt being incapable of transferring said aqueous liquid through it in a reasonable time, when the amount of said flowable material is less than the amount that would overflow the belt and when the only force applied to the belt containing that amount of the flowable material on its top surface is the force of gravity, and said second belt being a material incapable of having transferred to it any substantial part of the dewatered product produced from said flowable aqueous material on said first belt after passage through the partial dewatering zone followed by the compression of the first belt by the second belt in the compression zone, and said second belt being of sufficient width and mounted above the first belt to trap partially dewatered aqueous material between the two belts during said compression of the first belt by the second belt.

2. The apparatus of claim 1 and further including:
means to add wash water to the first belt downstream of said means to remove said dewatered product from the first belt;
means to compress the first belt downstream of the means to add wash water for the removal of liquid from the belt; and
means to collect water removed from the belt by said last-mentioned compression means.

3. The apparatus of claim 2 wherein said second belt is compressible and resilient and comprises porous cellular material.

4. The apparatus of claim 3 wherein at least the first of said belts comprises fine-pore cellulose sponge.

5. The apparatus of claim 4 wherein:
said second belt has a thickness that is sufficiently small to transfer aqueous liquid through it to its other other surface during the transfer of such aqueous liquid through the first belt;
the apparatus is constructed to allow removal of aqueous liquid as it passes out the other surface of the second belt after it is transferred through the second belt during the use of the apparatus; and
wherein the upstream portion of the bottom run of the second belt is slightly inclined downwardly in the direction of travel for the second belt to gradually abut the first belt so as to trap flowable aqueous material between the two belts before substantial downward pressure is applied by the second belt.

6. The apparatus of claim 5 and further including means to contact the outer surface of the second belt downstream of the compression zone for removal of dewatered product from that surface.

7. The apparatus of claim 6 wherein the top run of the first belt in the partial dewatering zone is substantially elongated from the place of application of the flowable aqueous material to provide a substantial absorption of water from said material into first belt before entering the compression zone.

8. The apparatus of claim 6 and further including means to compress the first belt upstream a short distance from the beginning of the partial dewatering zone to permit the addition of said flowable material during the expansion of the belt.

9. The apparatus of claim 6 wherein the means to apply flowable aqueous material comprises a hopper having an outlet in its bottom portion and a spout communicating with said outlet, said spout extending downwardly and having and opening at its lower end adjacent the top run of the first belt.

10. The apparatus of claim 9 wherein:
said spout extends downwardly opposite to the direction of travel of the top run of the first belt; and
said apparatus further includes means to compress the first belt upstream sufficiently close to the bottom opening of said spout for expansion of the first belt to occur below the bottom opening and downstream out that location.

11. The apparatus of claim 1 wherein:
both endless belts comprise fine-pore cellulose sponge;
said means to support said first belt includes a pair of rolls mounted to have their top surfaces at a horizontal plane and a number of intermediate rolls supported to have their top surfaces at that plane and to provide a support for the first belt at the top run between said pair of rolls, said first belt being trained about the pair of rolls;
said means to move the first belt includes means to rotates one of said pair of rolls;
said means to support the second belt includes another pair of rolls about which that belt is trained and a number of other rolls between and below said another pair of rolls to abut the second belt, to define its travel in its lowermost run, and to press both belts against some of said intermediate rolls;
said means to move the second belt includes means to rotate one of said another pairs of rolls so that the belt is driven with its lowermost run moves the same direction moves the same direction as the opposed top run of the first belt;
said dewatered product removal means for the first belt being a doctor blade abutting the outer surface of that belt as it moves around the roll rotated by the moving means, said blade being almost tangentially positioned relative to the arc of the belt about the roll;
said applying means including a hopper having an outlet in its bottom portion and a spout communicating with that outlet and extending downward to the top run of the first belt.

12. The apparatus of claim 11 wherein:
the bottom surfaces of some of said number of other rolls are in horizontal planes above the bottom surfaces of rest of said number of other rolls so as to move the second belt gradually onto the first belt to trap flowable aqueous material between the belts before substantial pressure application by the rest of said other rolls and some said intermediate rolls;
the spout extends away downwardly and in a direction upstream of the top run of the first belt; and
wherein the apparatus further includes a pair of rolls between which the first belt passes for compression, said pair being upstream of the bottom of said spout but sufficiently close for the belt to expand below the downstream of that opening of the spout.

UNITED STATES PATENT OFFICE
CERTIFICATE OF CORRECTION

Patent No. 3,601,039     Dated August 24, 1971

Inventor(s) Donald S. Schover

It is certified that error appears in the above-identified patent and that said Letters Patent are hereby corrected as shown below:

On the cover sheet in the Abstract, line 18, "o" should read -- to -- . Column 1, line 55, cancel "differ from". Column 2, line 22, "or" should read -- of -- . Column 3, line 4, "or" should read -- of -- . Column 4, line 10, after "to" insert -- 85 -- ; line 16, "along" should read -- alone -- ; line 22, "10 to 12" should read -- 10 percent to 12 percent -- ; line 27, after "35", insert -- percent -- . Column 5, line 65, "higher", should read -- either --; line 67, "precess" should read -- process -- . Column 6, line 5, "extend", should read -- extent -- ; line 74, "of", second occurrence, should read -- by -- . Column 7, line 20, after "grit", insert -- removal device 11 from which separated grit is -- ; line 30, "plane" should read -- place -- ; line 41, after "90", insert -- percent -- ; line 62, after "may", insert -- be -- ; line 67, after "apparatus", insert -- 27 is higher in solids -- . Column 8, line 15, after "3", insert -- percent -- ; line 24, after "from", insert -- apparatus 27' to vessel 22 rather than the admixture of -- ; line 46, "sued" should read -- used -- . Column 9, lines 4 and 5, cancel "roll 37 so that belt 35 travels horizontally from"; line 15, before "upper", insert -- top -- ; line 53, change "Tonawand" to read -- Tonawanda -- ; line 73, "or", should read -- of -- . Column 10, line 18, after "pulley 71 is fixedly mounted", insert -- on shaft 66 and drives a belt 72 that drives a pulley 73 that is fixedly mounted on a shaft 74 on which roll 51 is fixedly mounted -- ; line 29, "rolls", should read -- roll -- ; line 31, cancel "over"; line 39, before "water" insert -- excess -- ; line 75, "their their" should read -- their length -- . Column 12, line 43, "outer" should read -- other -- . Column 13, line 44, "production", should read -- product -- . Column 14, before line 35, insert the following paragraph:
-- The description has been presented solely for the purpose of illustration and not by way of limitation of the invention because the latter is limited only by the claims that follow. --

UNITED STATES PATENT OFFICE
CERTIFICATE OF CORRECTION

Patent No. 3,601,039　　　　　　　　　Dated August 24, 1971

Inventor(s) Donald S. Schover　　　　　--2--

It is certified that error appears in the above-identified patent and that said Letters Patent are hereby corrected as shown below:

Column 16, line 21, "rotates" should read -- rotate -- ; lines 31 and 32, cancel "moves the same direction"; line 37, "the roll" should read -- that roll -- ; line 55, "the belt" should read -- that belt -- and "the downstream" should read -- and downstream -- . Column 1, line 70, "THe" should read -- The -- .

Signed and sealed this 12th day of December 1972.

(SEAL)
Attest:

EDWARD M. FLETCHER, JR.　　　　　　　ROBERT GOTTSCHALK
Attesting Officer　　　　　　　　　　Commissioner of Patents